United States Patent
Crites et al.

(10) Patent No.: US 10,977,685 B1
(45) Date of Patent: Apr. 13, 2021

(54) IDENTITY RESOLUTION SERVICE

(71) Applicant: Amazon Technologies, Inc., Seattle, WA (US)

(72) Inventors: Halston Crites, New York, NY (US); Richard Everett Edwards, III, Seattle, WA (US); John Koster, IV, Seattle, WA (US); John Michael Nilles, Poulsbo, WA (US); Michael G. Yee, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 899 days.

(21) Appl. No.: 14/700,874

(22) Filed: Apr. 30, 2015

(51) Int. Cl.
*G06Q 30/02* (2012.01)

(52) U.S. Cl.
CPC ................ *G06Q 30/0246* (2013.01)

(58) Field of Classification Search
CPC ............ G06Q 30/0269; G06Q 30/0246
See application file for complete search history.

(56) References Cited

U.S. PATENT DOCUMENTS

| | | | |
|---|---|---|---|
| 6,484,182 B1 * | 11/2002 | Dunphy | G06F 17/30958 700/231 |
| 7,587,502 B2 * | 9/2009 | Crawford | A63F 13/12 463/42 |
| 7,711,586 B2 * | 5/2010 | Aggarwal | G06Q 10/02 700/14 |
| 8,527,350 B2 | 9/2013 | Ma | |
| 8,732,322 B1 | 5/2014 | Agrawal et al. | |
| 9,203,905 B1 * | 12/2015 | Hong | H04L 63/083 |
| 9,515,984 B1 * | 12/2016 | Griggs | H04L 63/1408 |
| 10,019,731 B1 | 7/2018 | Wu et al. | |
| 10,169,778 B1 | 1/2019 | Collin et al. | |
| 2007/0073585 A1 | 3/2007 | Apple | |
| 2007/0244746 A1 | 10/2007 | Issen et al. | |
| 2010/0198680 A1 | 8/2010 | Ma | |

(Continued)

OTHER PUBLICATIONS

Ads That Follow You Home: Has Tapad Cracked The Code Of Cross-Device Advertising. (Jun. 10, 2013). Forbes. Retrieved on May 12, 2020. Retrieved from <URL:https://www.forbes.com/sites/jjcolao/2013/05/23/ads-that-follow-you-home-has-tapad-cracked-the-code-of-cross-device-advertising/?sh=57c748cb2f25>. (Year: 2013).*

*Primary Examiner* — James M Detweiler
*Assistant Examiner* — Monica A Mandel
(74) *Attorney, Agent, or Firm* — Eversheds Sutherland (US) LLP

(57) ABSTRACT

The systems and methods are directed to identity resolution service (IRS) which may be used to enable accurate and faster conversion contribution analysis across multiple channels. IRS may be responsible for keeping track of relationships between user identifiers and for determining a user canonical identifier given a set of input identifiers and identity mappings. Users may utilize multiple devices and browsers to view advertisements and perform actions that result in conversion events. Users may be anonymous on one device but logged in and recognized on a different device and/or browser. The canonical identifier associated with a user may be used to obtain a full set of conversion events generated by the user and the full set of ad traffic to which the user was exposed. Conversion attribution analysis using the full set of conversion events and full set of ad traffic will result in accurate conversion rates for advertisers.

20 Claims, 8 Drawing Sheets

(56) References Cited

U.S. PATENT DOCUMENTS

| | | |
|---|---|---|
| 2011/0191714 A1 | 8/2011 | Ting et al. |
| 2011/0238525 A1 | 9/2011 | Linden |
| 2012/0265735 A1 | 10/2012 | McMillan et al. |
| 2012/0324501 A1 | 12/2012 | Klein et al. |
| 2013/0124309 A1* | 5/2013 | Traasdahl ............... H04L 67/22 705/14.49 |
| 2013/0124315 A1 | 5/2013 | Doughty |
| 2013/0290711 A1 | 10/2013 | Rajkumar et al. |
| 2013/0332604 A1 | 12/2013 | Seth et al. |
| 2014/0188582 A1 | 7/2014 | Karson et al. |
| 2014/0207566 A1 | 7/2014 | Kamran et al. |
| 2015/0242885 A1 | 8/2015 | Alsina |
| 2015/0324849 A1 | 11/2015 | Datar et al. |
| 2015/0341453 A1* | 11/2015 | Miller .................... H04L 67/22 709/204 |
| 2016/0027040 A1* | 1/2016 | Clemente Filho ..... G06N 7/005 705/14.45 |
| 2016/0071144 A1 | 3/2016 | Abedi et al. |
| 2017/0206552 A1 | 7/2017 | Rajkumar |

* cited by examiner

IDENTITY RESOLUTION SERVICE

BACKGROUND

Online advertising is the delivery of promotional marketing messages to consumers over the Internet. Examples of online advertising may include email marketing, search engine marketing, social media marketing, many types of display advertising, and mobile advertising. Advertisers may invest in an advertising campaign, which may include delivery of advertisements to users over different types of devices. For example, an advertising campaign may involve emailing advertisements, publishing advertisements on websites, publishing advertisements on social media, and the like. The different modes of delivery of the advertisements may be referred to as channels. Thus, if a user receives an email on their mobile device and also sees the advertisement on a webpage using a web browser on a laptop, then the user has been reached over different channels.

Accordingly, users may utilize multiple devices before executing a conversion event, such as a purchase of a product. However, the use of multiple devices may cause difficulties in crediting a specific advertisement exposed or delivered to a user with a conversion event, which may include, but is not limited to, visiting product detail pages, visiting the read all reviews page for a product, adding a product to a wish list, adding a product to a shopping cart, subscribing to a product, and/or purchasing a product. For example, a user may first be exposed to a particular ad through a promotional email received on a smartphone. The user may later use a web browser on their laptop to visit a webpage for the product of the ad and ultimately purchase the product. However, because the initial ad exposure was through the email, it may be difficult to credit the advertisement in the email with the conversion event of purchasing the product of the ad. The inability to credit advertisements across different devices may result in inaccurate accounting for an ad campaign and an incorrect estimate of the effectiveness of an advertisement. For example, some advertisements may not be credited with any conversion events, despite users purchasing the product as a result of viewing the advertisement on a different device. Similarly, some advertisements may receive duplicative credits even though the product purchase was a result of viewing a different advertisement.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
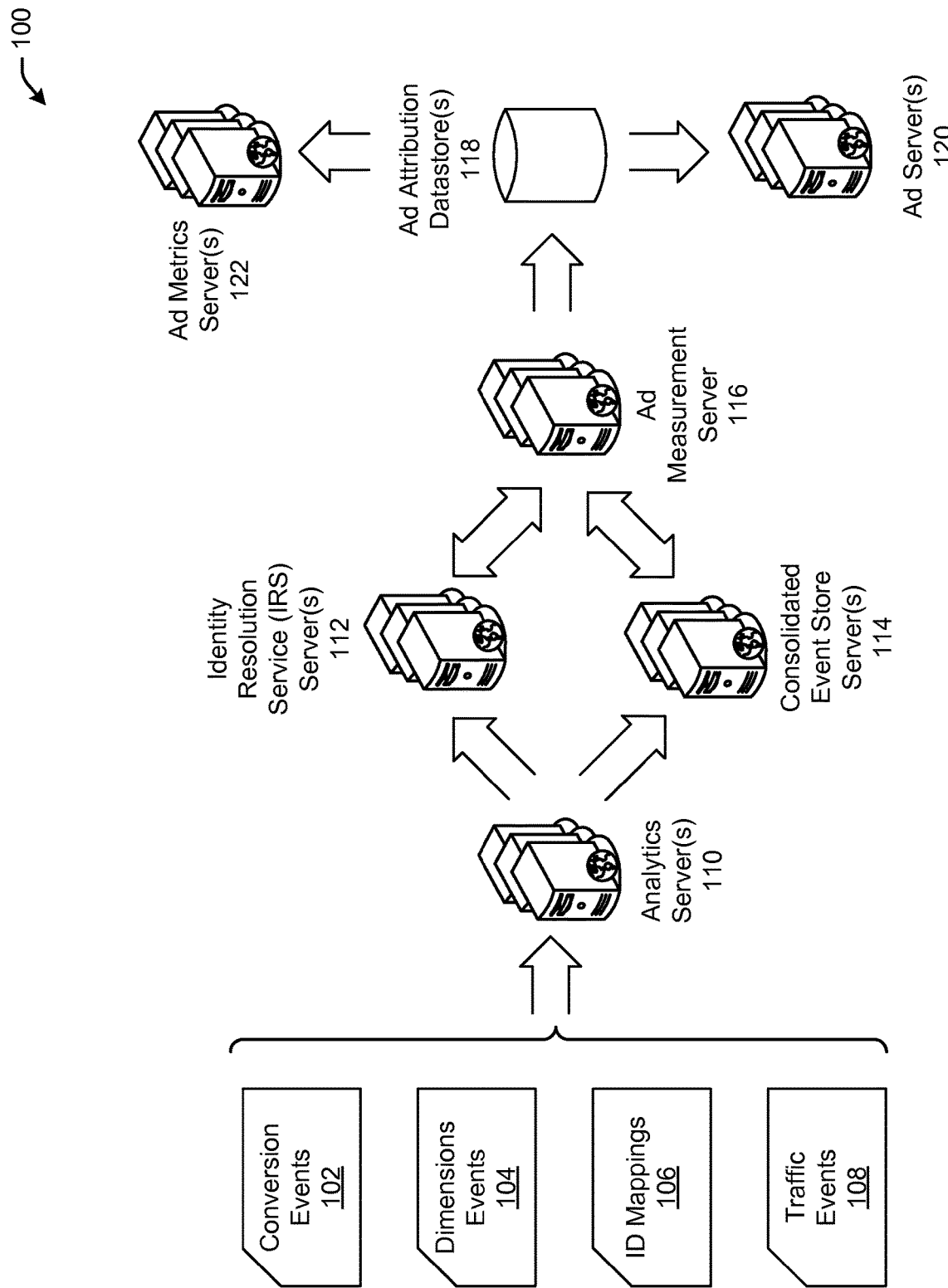
FIG. 1 depicts an illustrative data flow between various components of an illustrative system architecture for an identity resolution service in accordance with one or more embodiments of the disclosure.

This disclosure relates to, among other things, systems, methods, computer-readable media, techniques, and methodologies for cross-channel online advertisement ("ad") attribution. Advertisers may develop ad campaigns to deliver advertisements to users. The advertisements may be delivered through different channels on different user devices. For example, advertisements may be delivered through email marketing, search engine marketing, social media marketing, many types of display advertising, and mobile advertising. The systems and methods described herein are directed to identity resolution service (IRS) which may be used to enable accurate and faster conversion contribution analysis across multiple channels. IRS may be responsible for keeping track of relationships between user identifiers and for determining a user canonical identifier given a set of input identifiers and identity mappings. Users may utilize multiple devices and browsers to view advertisements and perform actions that result in conversion events. Users may be anonymous on one device but logged in and recognized on a different device and/or browser. The canonical identifier associated with a user may be used to obtain a full set of conversion events generated by the user and the full set of ad traffic to which the user was exposed. Conversion attribution analysis using the full set of conversion events and full set of ad traffic will result in accurate conversion rates for advertisers.

Advertisement attribution is the process of identifying a set of actions ("events") that contribute in some manner to a desired outcome ("conversion"). For example, advertisement attribution may enable an advertisement that was delivered to a user to be credited for a conversion that may have occurred on a different device by the same user at a later time. The IRS is responsible for keeping track of relationships between user identifiers and determining a user canonical identifier given a set of input identifiers and identity mappings. The identifiers may be logged together in ad server impression and click logs. Id mapping may be provided through data feeds from a Stable Identity Service (SIS), data service, and/or a device special offers service. The SIS is a service that may manage anonymous user identity across devices, ad exchanges, third party applications, and owned and operated properties. The data service may be a source of mappings from adBrowserIds to AdUserIds. The device special offers service may be an display advertisement program for specific user devices which may support ad delivery and traffic reporting while the device is disconnected from the Internet.

The IRS system may include one or more analytics servers, one or more consolidated events store (CES) service servers, one or more IRS servers, one or more CES servers, one or more CES merge service servers, and/or one or more datastores. The analytics server may receive raw data from multiple sources. For example, the analytics server may receive log records from ad server that have some identity information. The analytics server may receive data from an SIS, which may provide user and device mapping information. The analytics server may obtain logs, events, and other information from multiple sources within an advertising system. The analytics server may process the information to anonymize the information (e.g., removing personally identifying information) and provide identity mappings and related information to the IRS server and events to the CES server.

The IRS server may process the received information to determine if a new canonical identifier needs to be generated or an existing canonical identifier needs to be updated or modified. In some embodiments, the IRS may use a heuristic for determining a canonical identifier to be associated with an event, such as using a identifier hierarchy, where certain identifier types are ranked higher than other identifier types and ultimately, of the identifiers associated with an event, the highest ranked identifier will be designated or used as the canonical identifier for the event. Once a canonical identifier is determined for an event, the IRS server may transmit the identifier to the CES server which will associate the canonical identifier with the appropriate events and store the events and identifiers together.

The IRS may generate a canonical identifier to be associated with a user based on different types of identifiers and information obtained from different sources. For example, the canonical identifier may be used for attribution of advertisement traffic events (e.g., ad views, ad clicks, etc.) with subsequent conversion events. Examples of conversion events may include product purchases and glance views, as well as other activities such as mobile application downloads, application initiations and program enrollment.

In some embodiments, the IRS servers may store identity mappings across all media channels to provide point-in-time canonical anonymized user identifiers. The IRS servers may generate a canonical identifier using multiple anonymized identifiers associated with users and identified from the raw data (e.g., session cookies, ad server cookies, etc.) obtained through the cross-channel advertisement attribution system. In some embodiments, the IRS servers may map the anonymized user identifiers to create a unified, canonical identifier and may maintain the canonical identifier and related mappings for a period of time (e.g., 30 days), enabling the cross-channel advertisement attribution system to connect user shopping events with subsequent conversion events (e.g., product purchase) even if the events occurred sometime later (e.g., up to 30 days later). In some embodiments, the user does not need to be explicitly logged into an account when generating the shopping events.

For example, a user who has not recently authenticated on a website may view an advertisement while browsing on their smartphone. The same user may later use a different device, such as a tablet, to visit the product promoted in the advertisement and then purchase the product from the website viewed earlier. The IRS server may resolve the identity of user for both sessions and devices to credit the mobile ad view with the tablet product purchase.

In another example, a user may click on an advertisement shown in a third party application on the smartphone of the user. The ad click may launch a mobile web browser on smartphone to a product detail page where the user may proceed to purchase the promoted product. The IRS Server may resolve the identity of the user for the third party application and the mobile web browser session on the website to credit the application ad view with the browser-based purchased. In both of these examples, IRS uses event data already captured and may not require pixels or URL encodings to credit advertisements with conversions.

In another example, a user may view an ad for a product on their desktop on a third party website and initiate a purchase. The IRS server may resolve the identity of the user from their interactions with the third party website and purchase event. In such an example, the IRS server may use event data that was previously captured and may not require pixels or URL encodings to credit advertisements with conversions.

The CES server may receive information from the analytics server. The information may include advertising impressions and click records events that are then stored in a consolidated event store. And event may be stored using a canonical ID for that event. The CES servers may retain advertisement traffic records for an identified period (e.g., 3 months). In some embodiments, the advertisement traffic records may be sorted by the user identifiers provided by the IRS servers. The CES servers may provide advertisement traffic event lookup capabilities for the attribution and campaign lift functions.

In some embodiments a CES service server may receive the information from the analytics server and may manage the flow of data within the IRS system. For example, the CES service server may obtain information from the analytics server and determine which portion of the data should be transmitted to the IRS server and which data should be transmitted to the CES server. The CES service server may obtain canonical identifiers from the IRS server and may distribute the canonical identifiers to the CES servers accordingly, thus enabling the IRS and CES to work independently without direct communication with each other.

Additionally, the CES service server may transmit a request (e.g., originating from a different server, such as an advertisement measurement server) for a canonical identifier. The CES service server may transmit the request to the IRS, and upon receipt of the canonical identifier, may transmit the identifier to the requesting server as well as updating the CES server.

In some embodiments, a CES merge service server may facilitate updating events to be associated with a new canonical identifier. For example, the CES merge service server may receive a notification or request to initiate a merge. The request may include the old canonical identifier, the new canonical identifier, and a time range to be used to identify events that need to be updated. In some embodiments, the CES merge service server may use the old canonical identifier and the time range from the request to obtain or retrieve events from the events datastore. The CES merge service server may update the association of the identified events to reflect the new canonical identifier. The CES merge service server may then store the new associations in the events store.

In some embodiments, the IRS server may track different types of mappings, such as direct mappings and inferred mappings. Direct mappings may be identifiers that were obtained together, such as from the same log file. Inferred mappings may be based on existing relationships between identifiers. Additionally, the mappings may also be tracked with segments of time identified from different sources. For example, the datastore may track that during a segment of time, a particular identifier was being used and from that point forward, the identifier should be used until a different identifier is identified.

The terms "delivery of an advertisement," "delivery of an advertisement impression," "presentment of an advertisement impression," "serving an ad impression," or any other similar term may be used interchangeably throughout this disclosure.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Case and System Architecture

FIG. 1 depicts an illustrative data flow 100 between various components of an illustrative system architecture for an identity resolution service in accordance with one or more embodiments of the disclosure.

One or more illustrative types of data are illustratively depicted in FIG. 1. The event data may include event data obtained from different sources. Event data may be generated by different devices and servers, such as laptops, smartphones, tablets, web servers, or the like. Event data may include conversion events 102, dimension data 104, identity mapping data 106, and/or ad traffic data 108, which may be generated and stored in different datastores, such as a conversion event datastore, a dimensions datastore, a user identity datastore, and a traffic events datastore. In some embodiments, the event data may be processed to anonymize the data and remove personally identifiable information from the system. Large quantities of data for many users may be generated by different systems. For example, an e-commerce system responsible for an online distributor may generate ecommerce events associated with transactions generated by users on their websites and/or mobile applications. In some embodiments, back end data services may collect and provide identifiers associated with users and user devices. Such information may also include session information, hardware information, and the like. Ad traffic events may include ad impression that were delivered to users and any subsequent events generated by the user, such as selecting or clicking an ad, viewing a details.

An analytics server 110 may receive the data (e.g., 102, 104, 106, 108) from one or more user device(s), servers, systems, etc., and may facilitate processing the data. The analytics server 110 may process all or a portion of the received data to one or more identity resolution service (IRS) servers 112 and/or one or more consolidated event store (CES) servers 114. In some embodiments, identity mappings may be transmitted to the IRS servers 112 and events, such as advertising events, may be transmitted to the CES servers 114.

In some embodiments, the IRS servers 112 may process the identity mappings and may store identity mappings across all media channels to provide point-in-time canonical anonymized user identifiers. The IRS servers 112 may generate a canonical identifier and corresponding canonical identifier mappings using multiple anonymized identifiers associated with users and identified from the data (e.g., session cookies, ad server cookies, etc.) obtained from the analytics server 110. In some embodiments, the IRS servers 112 may map the anonymized user identifiers to create a unified, canonical identifier and may maintain the canonical identifier and related canonical identifier mappings for a period of time (e.g., 30 days), enabling the advertisement attribution systems to connect user shopping events with subsequent conversion events (e.g., product purchase) even if the events occurred sometime later (e.g., up to 30 days later). In some embodiments, the user does not need to be explicitly logged into an account when generating the shopping events. In some embodiments, the canonical identifiers and canonical identifier mappings may be stored in a datastore and may be updated upon receipt of related identifiers or a determination that the canonical identifier should be updated based on received information from one or more servers.

In some embodiments, the CES servers 114 may process the event data and identify ad traffic events (e.g., shopping events, non-shopping events, conversion events, etc.). The CES servers 114 may retain advertisement traffic records for an identified period (e.g., 3 months). In some embodiments, the advertisement traffic records may be sorted by the user identifiers provided by the IRS servers 114. The CES servers 114 may provide advertisement traffic event lookup capabilities for the attribution and campaign lift functions.

The IRS servers 112 and/or the CES servers 114 may transmit the processed data (e.g., identity mappings, canonical identifiers, ad traffic events) to the ad measurement server 116. The ad measurement server 116 may receive a canonical identifier and the processed data and may use the processed data to identify a conversion event and to identify an advertisement that should be attributed with the conversion event. The ad measurement server 116 may be able to identify conversion events that should be attributed to advertisement across different channels. The ad measurement server 116 may then transmit the processed data, attribution data generated in attributing a conversion event to the advertisement, and/or raw data to an ad attribution datastore 118. The ad attribution datastore 118 may be accessed by one or more servers, such as the ad server 120, for further processing or reporting. For example, the attribution data may be used to adjust ongoing ad campaigns to increase their effectiveness. Additionally, ad attribution data may be used to further develop and/or refine attribution models to be used on future iterations of processing data. In some embodiments, the system 100 may include an ad metrics server 122 that may access the ad attribution datastore 118. The ad metrics server 122 may retrieve information associated with one or more advertisements from the ad attribution datastore 118 and may generate one or more reports. For example, the ad metrics server 122 may obtain information associated with one or more ad campaigns and may generate a report, for example, for one or more advertisers that indicate a current status of the campaign (e.g., overall budget, remaining budget, etc.), effectiveness of one or more advertisements, or the like.

Figure 2:
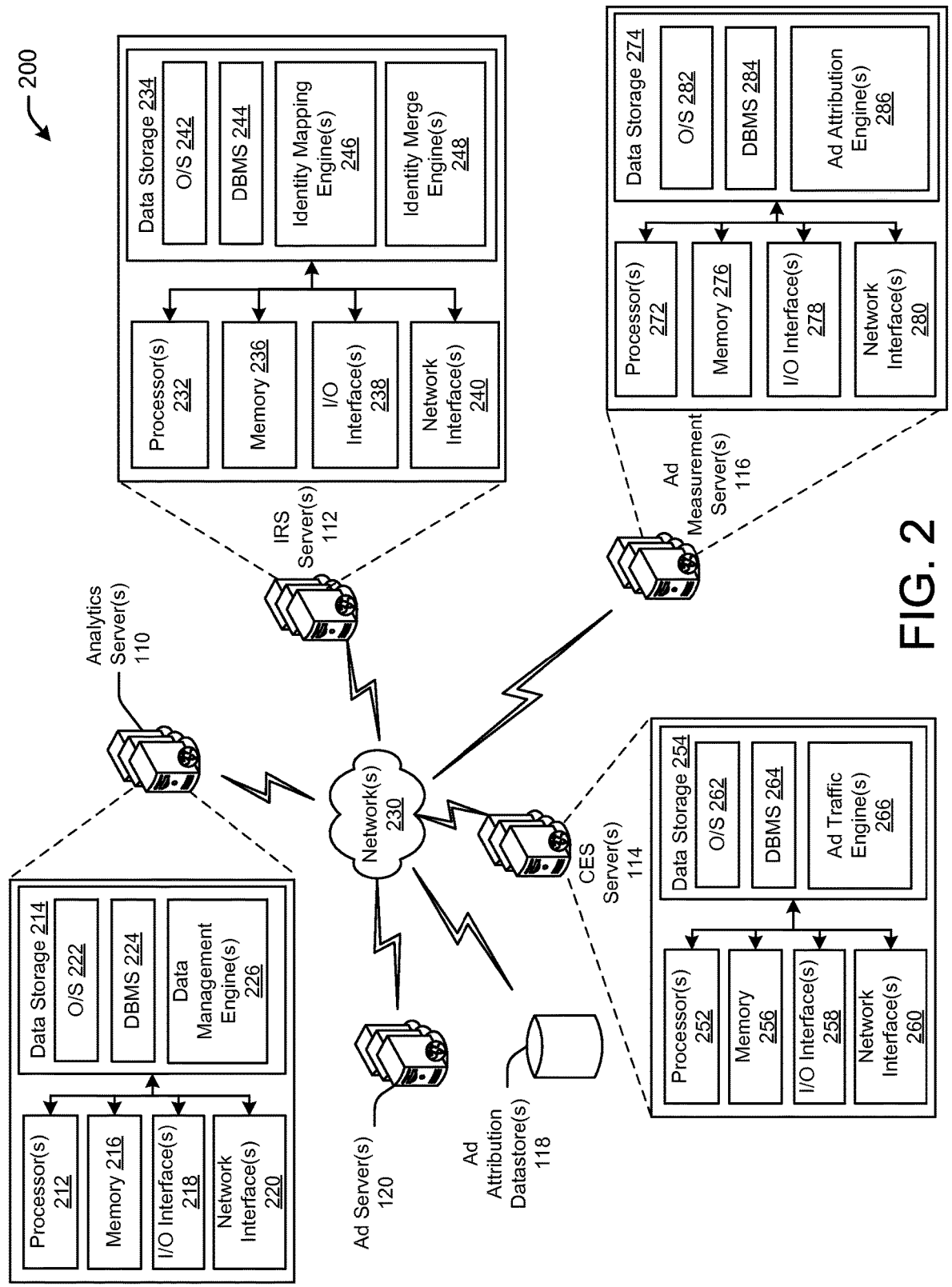
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture 200 depicted in FIG. 1 in accordance with one or more embodiments of the disclosure. FIG. 2, an analytics server 110, an IRS server 112, a CES server 114, an ad measurement server 116, an ad attribution datastore 118, and an ad server 120. Each component may be connected via network 230.

Any of the analytics server(s) 110, IRS server(s) 112, CES server(s) 114, ad measurement server(s) 116, ad attribution datastore(s) 118, and/or ad server(s) 120 may be configured to communicate with each other and any other component of the architecture 200 via one or more network(s) 230. The network(s) 230 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 230 may have any suitable communication range associated therewith and may include, for example, global networks (e.g., the Internet), metropolitan area networks (MANs), wide area networks (WANs), local area networks (LANs), or personal area networks (PANs). In addition, the network(s) 230 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Now referring to the analytics server 110, the analytics server 110 may include one or more processors (processor(s)) 212 and one or more memories 216 (referred to herein generically as memory 216). The processor(s) 212 may include any suitable processing unit capable of accepting digital data as input, processing the input data based on stored computer-executable instructions, and generating output data. The computer-executable instructions may be stored, for example, in the data storage 214 and may include, among other things, operating system software and application software. The computer-executable instructions may be retrieved from the data storage 214 and loaded into the memory 216 as needed for execution. The processor(s) 212 may be configured to execute the computer-executable instructions to cause various operations to be performed. The processor(s) 212 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 214 may store program instructions that are loadable and executable by the processor(s) 212, as well as data manipulated and generated by the processor(s) 212 during execution of the program instructions. The program instructions may be loaded into the memory 216 as needed for execution. Depending on the configuration and implementation of the analytics server 110, the memory 216 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 216 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The analytics server 110 may further include additional data storage 214 such as removable storage and/or non-removable storage including, but not limited to, magnetic storage, optical disk storage, and/or tape storage. Data storage 214 may provide non-volatile storage of computer-executable instructions and other data. The memory 216 and/or the data storage 214, removable and/or non-removable, are examples of computer-readable storage media (CRSM).

The analytics server 110 may further include network interface(s) 220 that facilitate communication between the analytics server 110 and other devices of the illustrative system architecture 200 (e.g., IRS server 112, CES server 114, etc.) or application software via the network(s) 230. The analytics server 110 may additionally include one or more input/output (I/O) interfaces 218 (and optionally associated software components such as device drivers) that may support interaction between a user and a variety of I/O devices, such as a keyboard, a mouse, a pen, a pointing device, a voice input device, a touch input device, a gesture capture or detection device, a display, speakers, a camera, a microphone, a printer, and so forth.

Referring again to the data storage 214, various program modules, applications, or the like may be stored therein that may comprise computer-executable instructions that when executed by the processor(s) 212 cause various operations to be performed. The memory 216 may have loaded from the data storage 214 one or more operating systems (O/S) 222 that may provide an interface between other application software (e.g., dedicated applications, a browser application, a web-based application, a distributed client-server application, etc.) executing on the analytics server 110 and the hardware resources of the analytics server 110. More specifically, the O/S 222 may include a set of computer-executable instructions for managing the hardware resources of the analytics server 110 and for providing common services to other application programs (e.g., managing memory allocation among various application programs). The O/S 222 may include any operating system now known or which may be developed in the future including, but not limited to, any mobile operating system, desktop or laptop operating system, mainframe operating system, or any other proprietary or open-source operating system.

The data storage 214 may further include one or more database management systems (DBMS) 224 for accessing, retrieving, storing, and/or manipulating data stored in one or more datastores (e.g., ad attribution datastore 118). The DBMS 224 may use any of a variety of database models (e.g., relational model, object model, etc.) and may support any of a variety of query languages.

The data storage 214 may additionally include various other program modules that may include computer-executable instructions for supporting a variety of associated functionality. For example, the data storage 214 may include one or more data management engine(s) 226.

The data management engine(s) 226 may include computer-executable instructions that in response to execution by the processor(s) 212 cause operations to be performed including receiving or otherwise obtaining raw data from one or more sources, such as user device(s), datastores, server(s) and the like. The data management engine 226 may facilitate processing of the raw data by transmitting a subset of the raw data to an IRS server 112 and/or a CES server 114 for processing. In some embodiments, the data management engine 226 may also facilitate transmission of data (e.g., raw and/or processed) to one or more datastores, such as the ad attribution datastore 112, for storage.

Within the data storage 214, one or more modules may be stored. As used herein, the term module may refer to a functional collection of instructions that may be executed by the one or more processor(s) 212. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Now referring to the IRS server 112, the IRS server 112 may include one or more processors (processor(s)) 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in the data storage 234 and may include, among other things, operating system software and application software. The computer-executable instructions may be retrieved from the data storage 234 and loaded into the memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into the memory 236 as needed for execution. Depending on the configuration and implementation of the ad measurement server 106, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The IRS server 112 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The IRS server 112 may further include network interface(s) 240 that facilitate communication between the IRS server 112 and other devices of the illustrative system architecture 200 (e.g., CES server 114, ad measurement server 116, etc.) or application software via the network(s) 230. The IRS server 112 may additionally include one or more input/output (I/O) interfaces 238 (and optionally associated software components such as device drivers) that may support interaction between a user and a variety of I/O devices, such as a keyboard, a mouse, a pen, a pointing device, a voice input device, a touch input device, a gesture capture or detection device, a display, speakers, a camera, a microphone, a printer, and so forth.

Referring again to the data storage 234, various program modules, applications, or the like may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the IRS server 112 and the hardware resources of the IRS server 112. More specifically, the O/S 242 may include a set of computer-executable instructions for managing the hardware resources of the IRS server 112 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores (e.g., ad attribution datastore 118). The DBMS 244 may use any of a variety of database models (e.g., relational model, object model, etc.) and may support any of a variety of query languages.

The data storage 234 may additionally include various other program modules that may include computer-executable instructions for supporting a variety of associated functionality. For example, the data storage 234 may include one or more identity mapping engine 246, and/or one or more identity merge engine(s) 248.

The identity mapping engine(s) 246 may include computer-executable instructions that in response to execution by the processor(s) 232 cause operations to be performed including receiving or otherwise obtaining raw data from one or more sources, such as the data management engine 226, datastores, server(s) and the like. The identity mapping engine 246 may use the data received to generate canonical identifiers and associate the canonical identifiers with one or more events. The mappings of the canonical identifiers and the one or more events may be used for attribution.

The identity merge engine 248 may include computer-executable instructions that upon execution by the processor(s) 232 configures the processor(s) 232 to detect that a change has been made where a canonical identifier has been updated and/or replaced. The identity merge engine 248 may facilitate or otherwise enable the identification of events that are associated with an old canonical identifier that need to be updated to the new canonical identifier. In some embodiments, the identity merge engine 248 may detect that there has been a chance in a canonical identifier by scanning metadata associated with canonical identifiers or scanning the values of fields associated with the canonical identifier.

Within the data storage 234, one or more modules may be stored. As used herein, the term module may refer to a functional collection of instructions that may be executed by the one or more processor(s) 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The CES server(s) 114 may include one or more processors (processor(s)) 252 and one or more memories 256 (referred to herein generically as memory 256). The processor(s) 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from the data storage 254 and loaded into the memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into the memory 256 as needed for execution. Depending on the configuration and implementation of the CES server(s) 114, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The CES server(s) 114 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The CES server(s) 114 may further include network interface(s) 260 that facilitate communication between the CES server(s) 114 and other devices of the illustrative system architecture 200 (e.g., IRS server(s) 112, analytics server(s) 110, etc.) or application software via the network(s) 230. The CES server(s) 114 may additionally include one or more input/output (I/O) interfaces 258 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 254, various program modules, applications, or the like may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the CES server(s) 114 and the hardware resources of the CES server(s) 114. More specifically, the O/S 262 may include a set of computer-executable instructions for managing the hardware resources of CES server(s) 114 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores. The DBMS 264 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or more ad traffic engine(s) 266.

The ad traffic engine 266 may include computer-executable instructions, code, or the like, that, responsive to execution by the processor(s) 252, may cause the ad traffic engine 266 to cause the CES server(s) 114 to retain advertisement traffic records for an identified period (e.g., three months). In some embodiments, the advertisement traffic records may be sorted by the user identifiers provided by the IRS server(s) 112. The ad traffic engine 266 may provide advertisement traffic event lookup capabilities for the attribution and campaign lift functions. In some embodiments, the ad traffic engine 266 may process the raw data received from the ad measurement server 116 to identify and store advertisement traffic data. The advertisement traffic data may then be transmitted back to the ad measurement server 116 for further processing.

Within the data storage 254, one or more modules may be stored. As used herein, the term module may refer to a functional collection of instructions that may be executed by the one or more processor(s) 252. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The ad measurement server(s) 116 may include one or more processors (processor(s)) 272 and one or more memories 276 (referred to herein generically as memory 276). The processor(s) 272 may include any suitable processing unit capable of accepting digital data as input, processing the input data based on stored computer-executable instructions, and generating output data. The computer-executable instructions may be stored, for example, in the data storage 274 and may include, among other things, operating system software and application software. The computer-executable instructions may be retrieved from the data storage 274 and loaded into the memory 276 as needed for execution. The processor(s) 272 may be configured to execute the computer-executable instructions to cause various operations to be performed. The processor(s) 272 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 274 may store program instructions that are loadable and executable by the processor(s) 272, as well as data manipulated and generated by the processor(s) 272 during execution of the program instructions. The program instructions may be loaded into the memory 276 as needed for execution. Depending on the configuration and implementation of the ad measurement server(s) 116, the memory 276 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 276 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The ad measurement server(s) 116 may further include additional data storage 274 such as removable storage and/or non-removable storage including, but not limited to, magnetic storage, optical disk storage, and/or tape storage. Data storage 274 may provide non-volatile storage of computer-executable instructions and other data. The memory 276 and/or the data storage 274, removable and/or non-removable, are examples of computer-readable storage media (CRSM).

The ad measurement server(s) 116 may further include network interface(s) 280 that facilitate communication between the ad measurement server(s) 116 and other devices of the illustrative system architecture 200 (e.g., IRS server(s) 112, CES server(s) 114, etc.) or application software via the network(s) 230. The ad measurement server(s) 116 may additionally include one or more input/output (I/O) interfaces 278 (and optionally associated software components such as device drivers) that may support interaction between a user and a variety of I/O devices, such as a keyboard, a mouse, a pen, a pointing device, a voice input device, a touch input device, a gesture capture or detection device, a display, speakers, a camera, a microphone, a printer, and so forth.

Referring again to the data storage 274, various program modules, applications, or the like may be stored therein that may comprise computer-executable instructions that when executed by the processor(s) 272 cause various operations to be performed. The memory 276 may have loaded from the data storage 274 one or more operating systems (O/S) 282 that may provide an interface between other application software (e.g., dedicated applications, a browser application, a web-based application, a distributed client-server application, etc.) executing on the ad measurement server(s) 116 and the hardware resources of the ad measurement server(s) 116. More specifically, the O/S 282 may include a set of computer-executable instructions for managing the hardware resources of the ad measurement server(s) 116 and for providing common services to other application programs (e.g., managing memory allocation among various application programs). The O/S 282 may include any operating system now known or which may be developed in the future including, but not limited to, any mobile operating system, desktop or laptop operating system, mainframe operating system, or any other proprietary or open-source operating system.

The data storage 274 may further include one or more database management systems (DBMS) 284 for accessing, retrieving, storing, and/or manipulating data stored in one or more datastores. The DBMS 284 may use any of a variety of database models (e.g., relational model, object model, etc.) and may support any of a variety of query languages.

The data storage 274 may additionally include various other program modules that may include computer-executable instructions for supporting a variety of associated functionality. For example, the data storage 274 may include one or more ad attribution engine(s) 286.

The ad attribution engine 286 may include computer-executable instructions, code, or the like, that, responsive to execution by the processor(s) 272, to obtain or otherwise receive a canonical identifier from the identity mapping engine 266 and one or more events from the ad attribution engine 286. The ad attribution engine 286 may use one or more ad attribution models to further process the data using the canonical identifier received from the IRS server(s) 112 and/or CES server(s) 114 to identify conversion events and attribute the identified conversion events to one or more advertisements. In some embodiments, the ad attribution engine 286 may execute one or more attribution models in parallel.

Within the data storage 274, one or more modules may be stored. As used herein, the term module may refer to a functional collection of instructions that may be executed by the one or more processor(s) 272. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The ad attribution datastore 118 may be accessible by components of the system 200 to provide information generated by the ad measurement server 116, IRS server 112, and/or CES server 114. While the illustrated embodiment depicts a certain number of components, other embodiments may include additional or fewer ad servers and/or aggregation servers or other components.

The ad server 120 may be any server in the fleet of servers associated with advertisements, such as an ad exchange server, an ad campaign server, a website/ad publisher server, an attribution model server, or the like. The ad server 120 may access data from the ad attribution datastore 118 for further processing or usage. For instance, the ad server 120 may be an attribution model server that uses the data stored in the ad attribution datastore 118 to generate or further develop attribution models by applying one or more machine learning algorithms to the data to train the models to generate more accurate attribution of conversion events to advertisements. In some embodiments, the ad server 120 may be an ad campaign server which may use the information from the ad attribution datastore 118 to adjust or modify parameters associated with an ad campaign to increase its efficiency and effectiveness.

Those of ordinary skill in the art will appreciate that any of the components of the system architecture 200 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 200, and the associated functionality that such components support, are merely illustrative and that some components may not be present or additional components may be provided in various embodiments. While various program modules have been depicted and described with respect to various illustrative components of the system architecture 200, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative system architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 200, or additional functionality.

Figure 3:
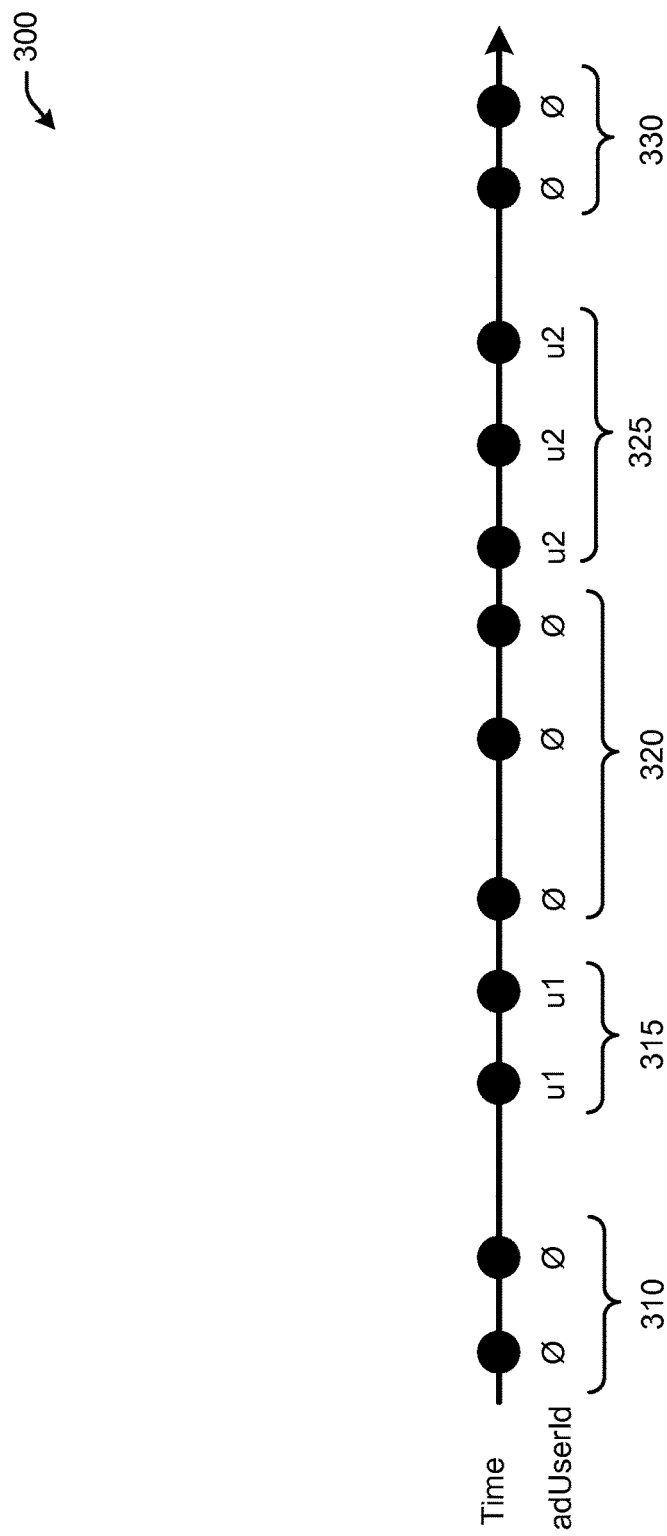
FIG. 3 is an example timeline of a browser session visiting a retail marketplace over time and how user identities may be resolved in accordance with one or more embodiments of the disclosure.

FIG. 3 is an example timeline 300 of a browser session visiting a retail marketplace over time and how user identities may be resolved in accordance with one or more embodiments of the disclosure. The timeline 300 depicts challenges with identity resolution on a shared device and how the heuristic is applied. The adBrowserId (e.g., anonymized sessionID obtained from a cookie of the retail marketplace) may remain constant throughout login/logout events. The adUserId line in the diagram may be used to indicate which recognized user is generating activity on the website or viewing advertisements. The activity grouped under 310, 320, or 330 is anonymous activity (represented by Ø). For 310, there is no login until 315. In the case of 320 and 330, a logout event occurred immediately prior to the anonymous activity. To demonstrate the heuristic assume only the adBrowserId to adUserId mappings reflected in the FIG. 3 are available. Given only the adBrowserId and a timestamp (e.g., represented as blocks 310, 315, 320, 325, 330), a canonical identifier may be determined. For example, within time period 315, adUserId u1 may be identified based on login/logout events. In some embodiments, the first logged in user for a given adBrowserId may inherit all unrecognized events which happened prior to the login/logout event. All other events may be assigned to the last logged in user. Accordingly, the anonymous activity from block 310 may be attributed to u1 as it is the first logged in user. In time period 325, adUserId u2 may be identified based on login/logout events. Accordingly, the anonymous events from time period 320 may be attributed to u1, which represents the time period after the login/logout event of u1 and prior to the login/logout events of u2 in time period 325. Additionally, the anonymous events from time period 330 may be attributed to u2, which presents anonymous activity that occurred after the login/logout events of u2.

Figure 4:
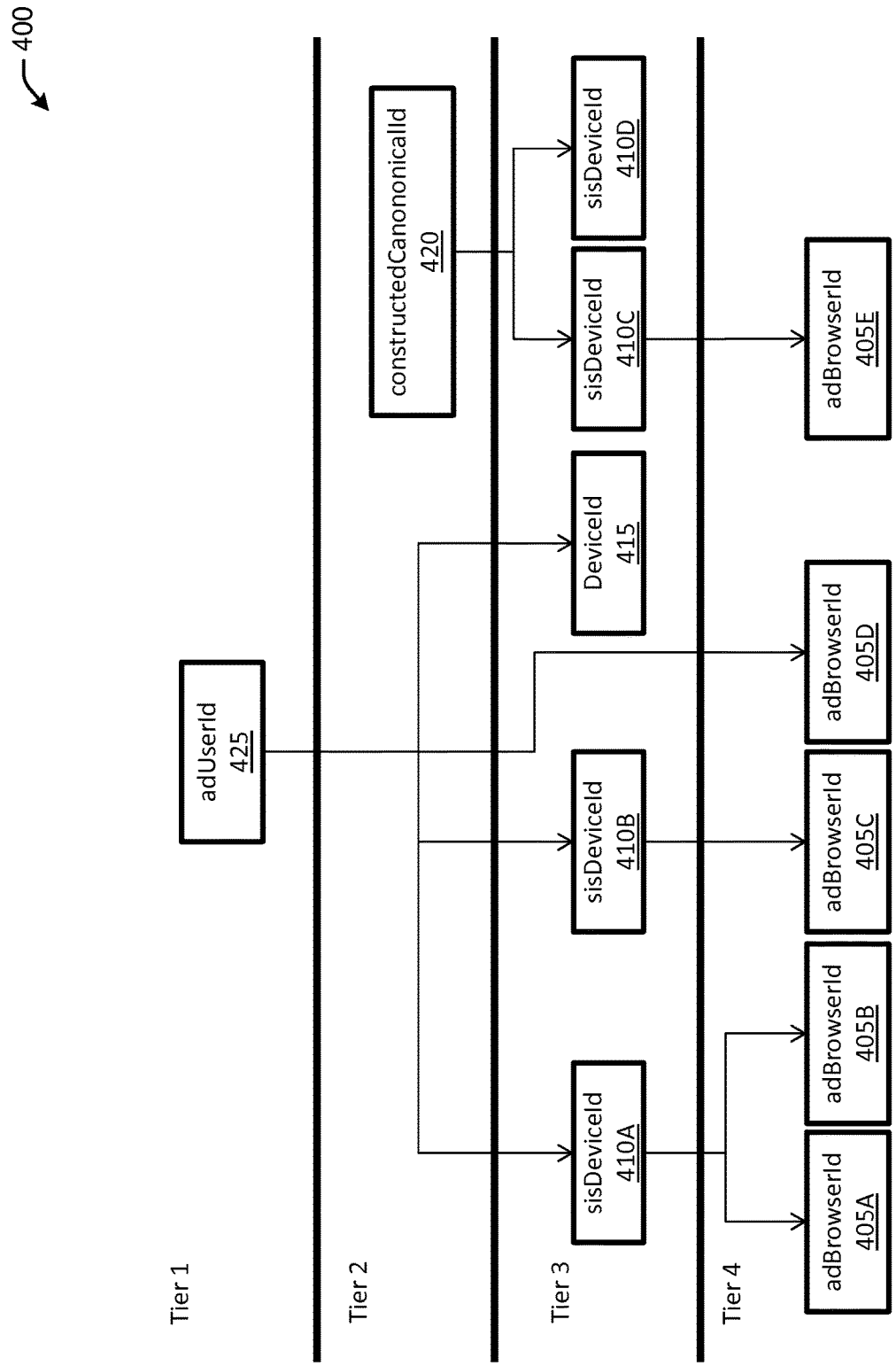
FIG. 4 is an example identifier hierarchy for an identity resolution service in accordance with one or more embodiments of the disclosure.

FIG. 4 is an example identifier hierarchy 400 for an identity resolution service in accordance with one or more embodiments of the disclosure. The IRS may be responsible for keeping track of relationships between user identifiers and determining a canonical identifier given a set of input identifiers and the id mappings. These identifiers are logged together in ad server impression and click logs. Id mappings may also be provided by special data feeds from stable identity service (SIS) which manages anonymous user identity across devices, ad exchanges, third party apps, and owned and operated properties. Id mappings may also be provide by data feeds from device traffic services, which support ad delivery and traffic reporting while a device is disconnected from the internet. Examples of user identifiers may include an adUserId 425, an adBrowserId 405A-405E (collectively 405), a sisDeviceId 410A-410D (collectively 410), a DeviceId 415, and a constructedCanonicalId 420. An adUserId 425 may be an anonymized customer identifier and may be the highest ranking type of identifier in the hierarchy 400. An adBrowserId 405 is an anonymized session identifier and may vary per browser and marketplace site visited. A sisDeviceId 410 may be a Stable Identity Service identifier and may vary per device or browser. The DeviceId 415 may be an anonymized device serial number. A constructedCanonicalId 420 may be a synthetic identifier built to support special mobile user cases. In some embodiments, the constructedCanonicalId 420 may be a temporary identifier that is generated to associate two or more peer identifiers (e.g., identifiers on the same level of the hierarchy). The constructedCanonicalId 420 may allow two peer identifiers to be linked until a higher level identifier is identified. For example, a mobile application may be associated with a first sisDeviceId 410A and a web browser executing on the same device may be associated with a second sisDeviceId 410B. A constructedCanonicalId 420 may be generated and associated with the first sisDeviceId 410A and the second sisDeviceId 410B and designated as the canonical identifier. Later, a user may log into an account using the web browser, thus identifying an adUserId 425. Upon identifying the adUserId 425, the constructedCanonicalId 420 may be replaced as the canonical identifier by the adUserId 425 and the constructedCanonicalId 420 may be discarded from the system.

In another example, a user may generate multiple adBrowserIds 405A, 405B using their desktop device. Both adBrowserIds may be associated with a sisDeviceId 410A. A second device utilized by the user, such as a laptop, may be associated with a second sisDeviceId 410B and a third adBrowserId 405C, where the sisDeviceId 410B and the adBrowserId 405C may be linked. Later, a user may log into an account using the web browsers on the two different devices, thus identifying an adUserId 425. Upon identification of the adUserId 425, the sisDeviceIds 410A, 410B may remain in the system as identifiers but the canonical identifier may be updated to reflect the adUserId 425.

Id mapping may be provided through data feeds from a Stable Identity Service (SIS), data service, and/or a device special offers service. The SIS is a service that may manage anonymous user identity across devices, ad exchanges, third party applications, and owned and operated properties. The SIS may provide mappings between SisDeviceIds 410, adUserIds 425, and adBrowserIds 405. The data service may be a source of mappings from adBrowserIds 405 to AdUserIds 425. The device special offers service may be an display advertisement program for specific user devices which may support ad delivery and traffic reporting while the device is disconnected from the Internet. The device special offers data feed may provide mappings from DeviceId 415 to adUserIds 425.

The identity hierarchy 400 shows the tier assigned to each identifier for determining a canonical id. To determine a canonical identifier, a single identifier or set of identifiers may be provided. Tier 1—adUserId 425 may be the preferred identifier to use as canonical id, so if it is provided in the input set or if it can be mapped to directly or indirectly via stored id mappings, then that is what will be the canonical id. Otherwise identifiers may be resolved in Tier 2 and so forth. For example if an adBrowserId 405 was the only identifier provided and it could be mapped directly to an adUserId 425 or indirectly via sisDeviceId 410, then the adUserId 425 would be canonical id. If adBrowserId 405 was only mapped to a sisDeviceId 410, then sisDeviceId 410 would be canonical id. If adBrowserId 405 didn't map to any other identifiers, then adBrowserId 405 would be canonical id.

Illustrative Data Flow

Figure 5:
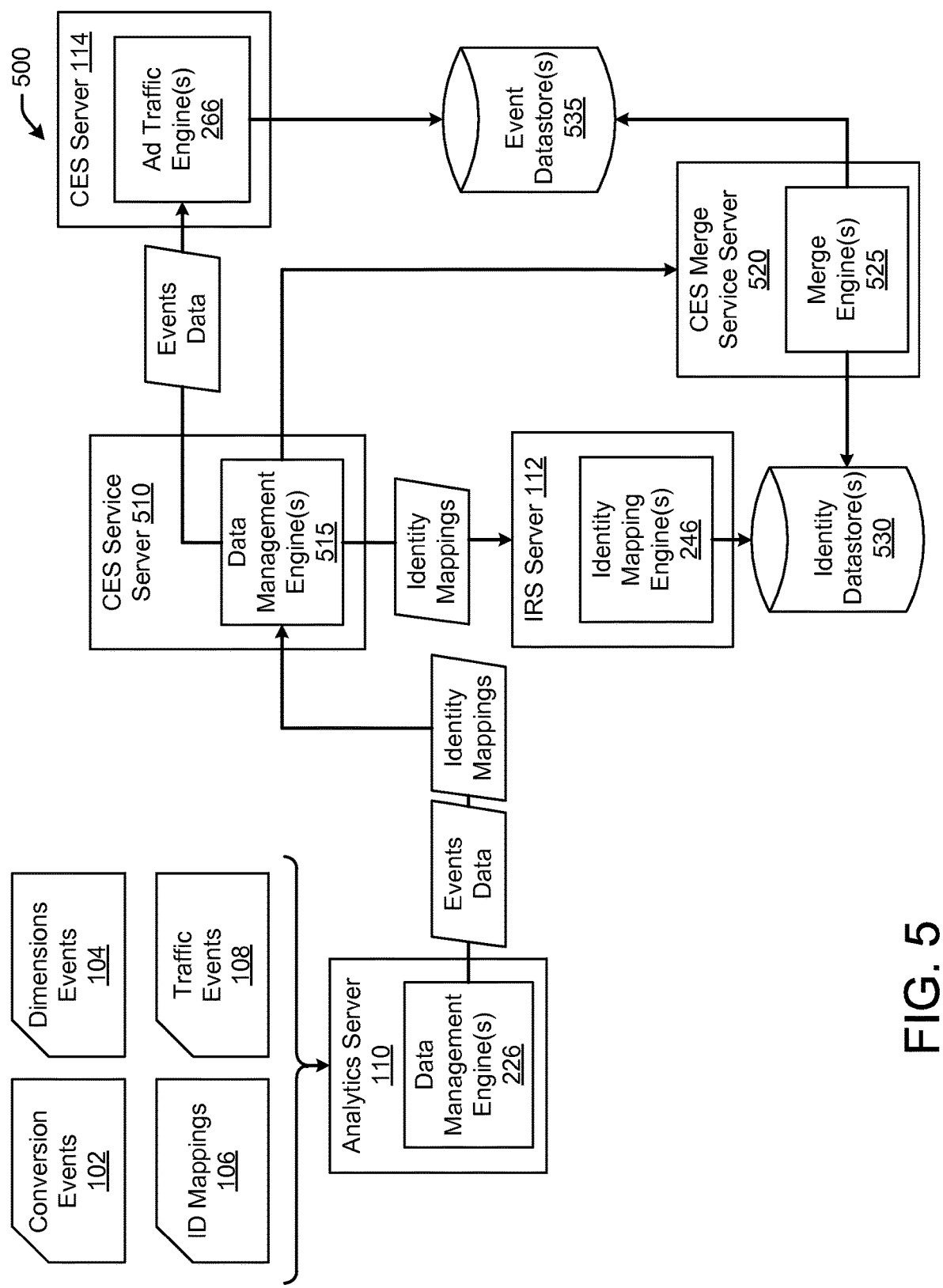
FIG. 5 is an illustrative data flow for an identity resolution service in accordance with one or more embodiments of the disclosure.

FIG. 5 is an illustrative data flow 500 for an identity resolution service in accordance with one or more embodiments of the disclosure.

Event data may include event data obtained from different sources. Event data may be generated by different devices and servers, such as laptops, smartphones, tablets, web servers, or the like. Event data may include conversion events 102, dimension data 104, identity mapping data 106, and/or ad traffic data 108, which may be generated and stored in different datastores, such as a conversion event datastore, a dimensions datastore, a user identity datastore, and a traffic events datastore. In some embodiments, the event data may be processed to anonymize the data and remove personally identifiable information from the system. Large quantities of data for many users may be generated by different systems. For example, an e-commerce system responsible for an online distributor may generate e-commerce events associated with transactions generated by users on their websites and/or mobile applications. In some embodiments, back end data services may collect and provide identifiers associated with users and user devices. Such information may also include session information, hardware information, and the like. Ad traffic events may include ad impression that were delivered to users and any subsequent events generated by the user, such as selecting or clicking an ad, viewing ad details.

An analytics server 110 may receive the events data (e.g., 102, 104, 106, 108) from one or more user device(s), servers, systems, etc., and may facilitate processing the events data. The analytics server 110 may process all or a portion of the received events data to one or more identity resolution service CES service server(s) 510. The CES service server(s) 510 may manage the flow of data to and from the IRS server(s) 112 and/or CES server(s) 114 and may interact with other server(s) such as ad server(s) and or ad measurement server(s) 116.

The data management engine 515 of the CES service server 510 may receive the events data and the identity mappings and may process the data. For example, the data management engine 515 may anonymized data and/or add prefixes to the values of the identifiers identified from the identity mappings. The data management engine 515 may then transmit the identity mappings to one or more IRS servers 112 and/or the events data to one or more CES server(s) 114. In some embodiments, the data management engine 515 may transmit events data that include identity mappings to one or more IRS serer 112.

In some embodiments, the IRS servers 112 may process the identity mappings and may store identity mappings to an identity datastore 530. In some embodiments, the IRS servers 112 may process events data to identify and obtain identity mappings from the events data received from the CES service server 510. The identity mapping engine 246 may store identity mappings across all media channels to provide point-in-time canonical anonymized user identifiers. The identity mapping engine 246 may generate a canonical identifier using multiple anonymized identifiers associated with users and identified from the data (e.g., session cookies, ad server cookies, etc.) obtained from the analytics server 110. In some embodiments, the identity mappings engine 246 may map the anonymized user identifiers to create a unified, canonical identifier and may maintain the canonical identifier and related mappings for a period of time (e.g., 30 days), enabling an advertisement attribution system to connect user shopping events with subsequent conversion events (e.g., product purchase) even if the events occurred sometime later (e.g., up to 30 days later). In some embodiments, the user does not need to be explicitly logged into an account when generating the shopping events.

In some embodiments, the CES servers 114 may process the event data, identify ad traffic events (e.g., shopping events, non-shopping events, conversion events, etc.), and store the ad traffic events in an event datastore 535. The ad traffic engine 266 may retain advertisement traffic records for an identified period (e.g., 3 months). In some embodiments, the advertisement traffic records may be sorted by the user identifiers provided by the identity mapping engine 246. The ad traffic engine 266 may provide advertisement traffic event lookup capabilities for the attribution and campaign lift functions.

The IRS servers 112 and/or the CES servers 114 may transmit the processed data (e.g., identity mappings, canonical identifiers, ad traffic events) to the ad measurement server 116. The ad measurement server 116 may receive a canonical identifier and the processed events data and may use the processed data to identify a conversion event and to identify an advertisement that should be attributed with the conversion event. The ad measurement server 116 may be able to identify conversion events that should be attributed to advertisement across different channels. The ad measurement server 116 may then transmit the processed data, attribution data generated in attributing a conversion event to the advertisement, and/or raw data to an ad attribution datastore 118. The ad attribution datastore 118 may be accessed by one or more servers, such as the ad server 120, for further processing or reporting. For example, the attribution data may be used to adjust ongoing ad campaigns to increase their effectiveness. Additionally, ad attribution data may be used to further develop and/or refine attribution models to be used on future iterations of processing data.

In some embodiments, the data management engine 515 may determine that a canonical identifier has been updated. For example, the identity mapping engine 246 may have determined that an existing canonical identifier should be updated to a higher ranked identifier through a process described in conjunction with FIGS. 3-4. The data management engine 515 may determine that a canonical identifier has been updated or newly generated based on metadata associated with a canonical identifier and/or one or more field values associated with the canonical identifier. Based on the determination, the data management engine 515 may transmit a message to the CES merge service server 520. The merge engine 525 of the CES merge service server 520 may obtain information from the message and may initiate a merge. A merge may involve identifying events associated with the old canonical identifier and updating the events to be associated with the new canonical identifier. The merge engine 525 may update the data in the identity datastore 530 and/or the event datastore 535. In some embodiments, the CES merge service server 520 may also periodically scan the datastores to determine if a merge needs to be initiated based on metadata or field values associated with the events. In some embodiments, the CES merge service server 520 may scan the datastore at configured time intervals.

Figure 6:
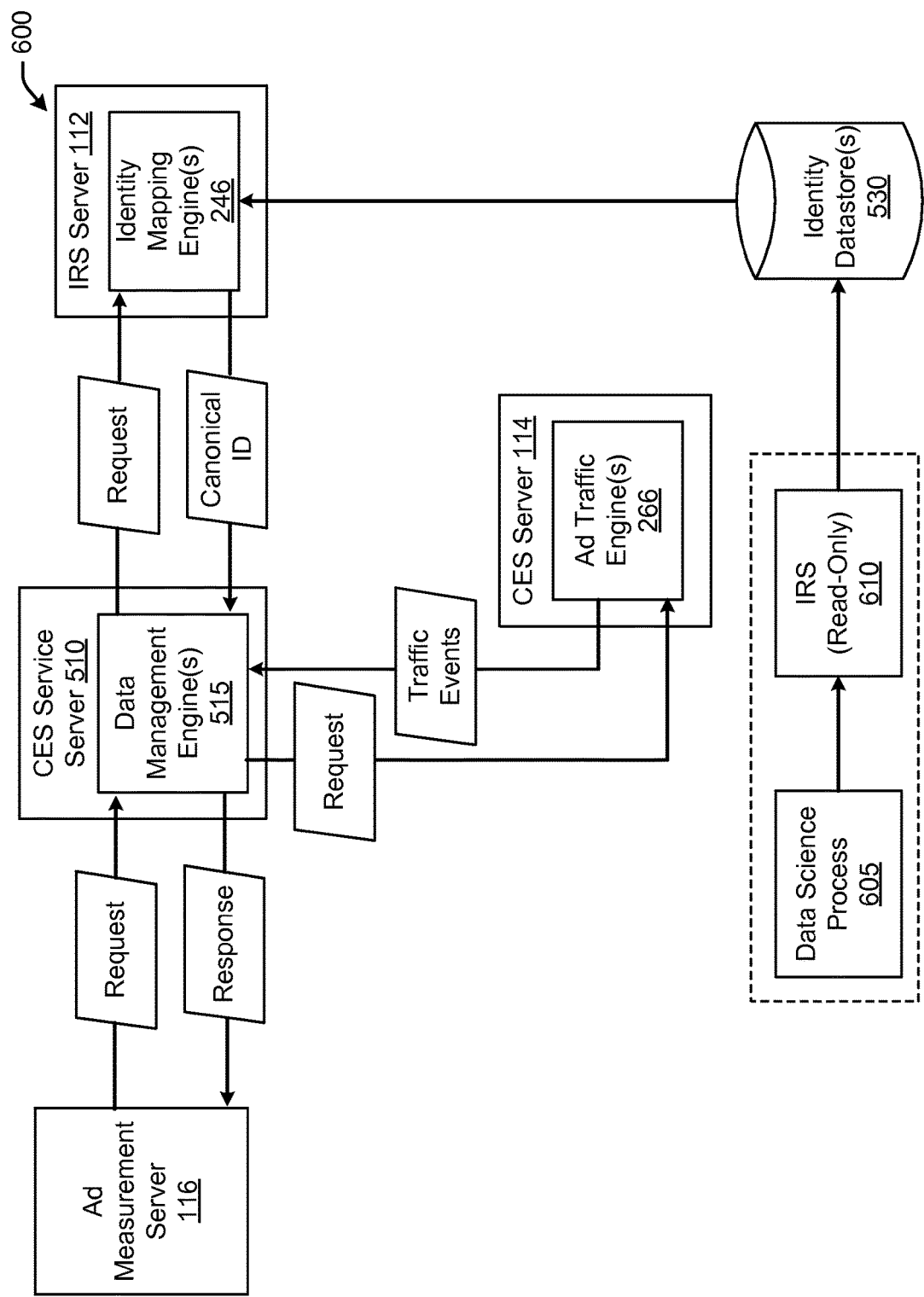
FIG. 6 is an illustrative data flow for example use cases for an identity resolution service in accordance with one or more embodiments of the disclosure.

FIG. 6 is an illustrative data flow 600 for example use cases for an identity resolution service in accordance with one or more embodiments of the disclosure. In one embodiment, an ad measurement server 116 may generate a request for a canonical identifier. The request may include one or more identifiers, such as an adBrowserId 405, a sisDeviceId 410, a Device Id 415, a constructedCanonicalId 420, and/or an adUserId 425. The request may also include additional information, such as a time stamp. The request may be transmitted to a data management engine 515 of a CES service server 510. The data management engine 515 may transmit the request to an identity mapping engine 246 of an IRS server 112. The identity mapping engine 246 may obtain or retrieve information from an identity datastore 530. The information may be retrieved using the one or more identifiers from the request. The identity mapping engine 246 may determine whether the one or more identifiers is associated with previously stored data and determine a canonical identifier. The identity mapping engine 246 may then generate a response that includes the canonical identifier and transmit the response to the data management engine 515.

The data management engine 515 may transmit the request to an ad traffic engine 266 of a CES server 114. The ad traffic engine 266 may identify one or more traffic events. In some embodiments, the traffic events may be retrieved from an event datastore 535. In some embodiments, the ad traffic engine 266 may receive a canonical identifier from the data management engine 515 (e.g., received from the identity mapping engine 246) and use the canonical identifier to identify one or more associated traffic events. The ad traffic engine 266 may then generate a response to the data management engine 515, which may include the one or more identified traffic events.

The data management engine 515 may then transmit the response that include the canonical identifier to the ad measurement server 116. In some embodiments, the data management engine 515 may include the one or more traffic events received from the ad traffic engine 266. The ad measurement server 116 may use the canonical identifier to identify a set of events and to attribute a conversion event to an advertising event for a particular user.

In some embodiments, other processes, such as a data science process 605, may use an IRS read-only service 610. The IRS read-only service may obtain data identity mappings from the identity datastore 530 but may not write any data to the identity datastore 530. The processes may use the IRS read-only service to resolve identifiers to a canonical identifier which may be used to identify events or the like. Examples of data science processes 605 that may use the IRS read-only service may include processes for retail data analysis. In other embodiments, a data science process 605 may include processes to anonymously process and/or reconcile user lists received from one or more sources with a known user list of the advertisement system. In some embodiments, the user lists are anonymized to remove any personally identifying information associated with users.

Illustrative Processes

Figure 7:
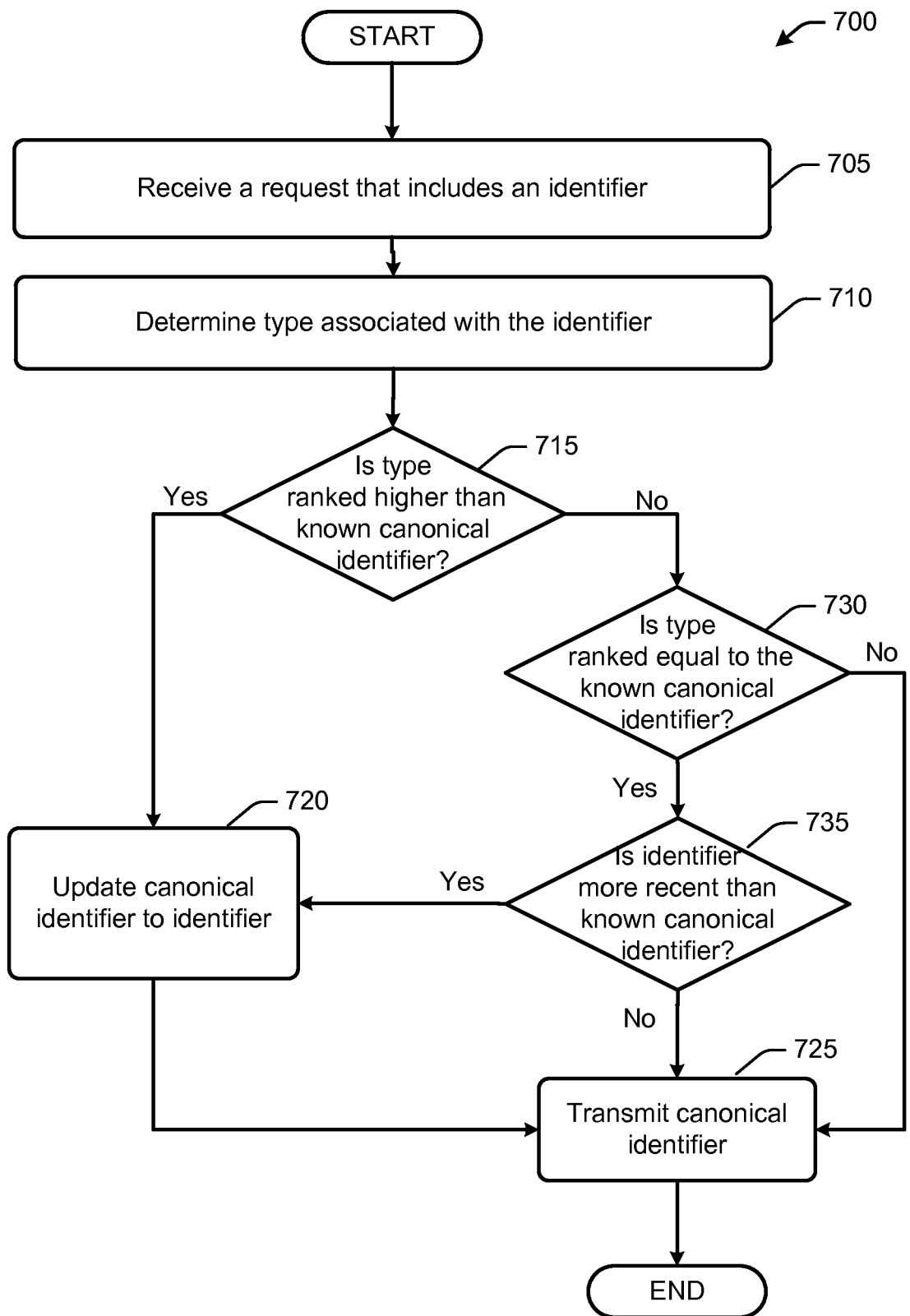
FIG. 7 is an illustrative process flow diagram for a method for resolving an identity in an identity resolution service in accordance with one or more embodiments of the disclosure.

FIG. 7 is an illustrative process flow diagram for a method 700 for resolving an identity in an identity resolution service in accordance with one or more embodiments of the disclosure. At block 705, the identity mapping engine 246 may receive a request that includes an identifier, where the request is for a canonical identifier. In some embodiments, an ad attribution engine 286 may generate a request that includes an identifier. The request may also include a time stamp or additional information associated with an event. The ad attribution engine 286 may transmit the request to the identity mapping engine 246.

At block 710, the identity mapping engine 246 may determine the identifier type associated with the identifier of the request. In some embodiments, the type of identifier may be determined based on a prefix of the value of the identifier. For example, if an adBroswerID may have a prefix of BI, an adUserId may have a prefix of UI, and a sisDeviceId may have a prefix of SD.

At block 715, the identity mapping engine 246 may determine whether the identifier type associated with the identifier is ranked higher than the known canonical identifier. For example, the identity mapping engine 246 may utilize an identifier hierarchy, such as the hierarchy depicted in FIG. 4. The identity mapping engine 246 may determine whether the received identifier is explicitly or implicitly associated with a second identifier stored in the identity datastore 530. For example, if the received identifier is an adBrowserId 405 and the identity mapping engine 246 determines the adBrowserId 405 is associated with an adUserId 425, because the adUserId is ranked higher (e.g., Tier 1 vs. Tier 4), the adUserId 425 will remain the canonical identifier. However, if the received identifier is a sisDeviceId 410 and the identity mapping engine 246 determines that the sisDeviceId 410 is associated with an adBroswerId 405, the sisDeviceId 410 would replace the adBrowserId 405 as the canonical identifier. Accordingly, if at block 715, the identity mapping engine 246 determines that the received identifier is ranked higher than the known canonical identifier retrieved from the identity datastore 530, the method may proceed to block 720. If at block 715, the identity mapping engine 246 determines that the received identifier is ranked lower than the known canonical identifier retrieved from the identity datastore 530, the method may proceed to block 725.

At block 720, the identity mapping engine 246 may update the canonical identifier to the received identifier. In some embodiments, the identity mapping engine 246 may generate metadata or add one or more values or fields associated with the canonical identifier to indicate that a merge should be initiated, as further described in relation to FIG. 8. The identity mapping engine 246 may then proceed to block 725.

At block 725, the identity mapping engine 246 may transmit the updated canonical identifier to the ad measurement server 116. In some embodiments, the identity mapping engine 246 may transmit the canonical identifier to the CES service server 510. The CES service server 510 may transmit the canonical identifier to the ad measurement server 116.

If at block 715, the identity mapping engine 246 determines that the type associated with the identifier is not higher than the known canonical identifier, the method may proceed to block 730.

At block 730, the identity mapping engine 246 may determine whether the type associated with the identifier is ranked equally to the type associated with the known canonical identifier. For example, if the received identifier is an sisDeviceId 410 and the canonical identifier is a DeviceId 415, the identity mapping engine 246 may determine that the identifier and the known canonical identifier are the same tier (e.g., based on a hierarchy as described in FIG. 4). If the identity mapping engine 246 determines the type associated with the identifier is not equal to the known canonical identifier (e.g., identifier is ranked lower than the known canonical identifier), the method may proceed to block 725, where the identity mapping engine 246 may transmit the canonical identifier to the ad measurement server 116. In some embodiments, the identity mapping engine 246 may transmit the canonical identifier to the CES service server 510. The CES service server 510 may transmit the canonical identifier to the ad measurement server 116.

If the identity mapping engine 246 determines the type associated with the identifier is equal to the known canonical identifier, the method may proceed to block 735. At block 735, the identity mapping engine 246 may determine whether the identifier is more recent than the canonical identifier. In some embodiments, the request that includes the identifier may also include a timestamp associated with the identifier (e.g., obtained from a log file or the like). The timestamp may be compare to a timestamp associated with the known canonical identifier (e.g., when the identifier that ultimately became the known canonical identifier was generated). If the identity mapping engine 246 determined that the identifier was newer or more recent than the known canonical identifier, then the method may proceed to block 720, where the canonical identifier would be updated to the identifier received in the request. If at block 735, the identity mapping engine 246 determined that the identifier was not more recent than the known canonical identifier, the method may proceed to block 725, where the canonical identifier would be transmitted to the ad measurement server 116 in response to the request. In some embodiments, the known canonical identifier may be transmitted to the CES service server 510 which may then transmit the known canonical identifier to the ad measurement server 116.

The ad measurement server 116 may then use the received canonical identifier to identify associated events. The ad attribution engine 286 may use the canonical identifier to attribute a conversion event to an advertisement event from the identified events.

Figure 8:
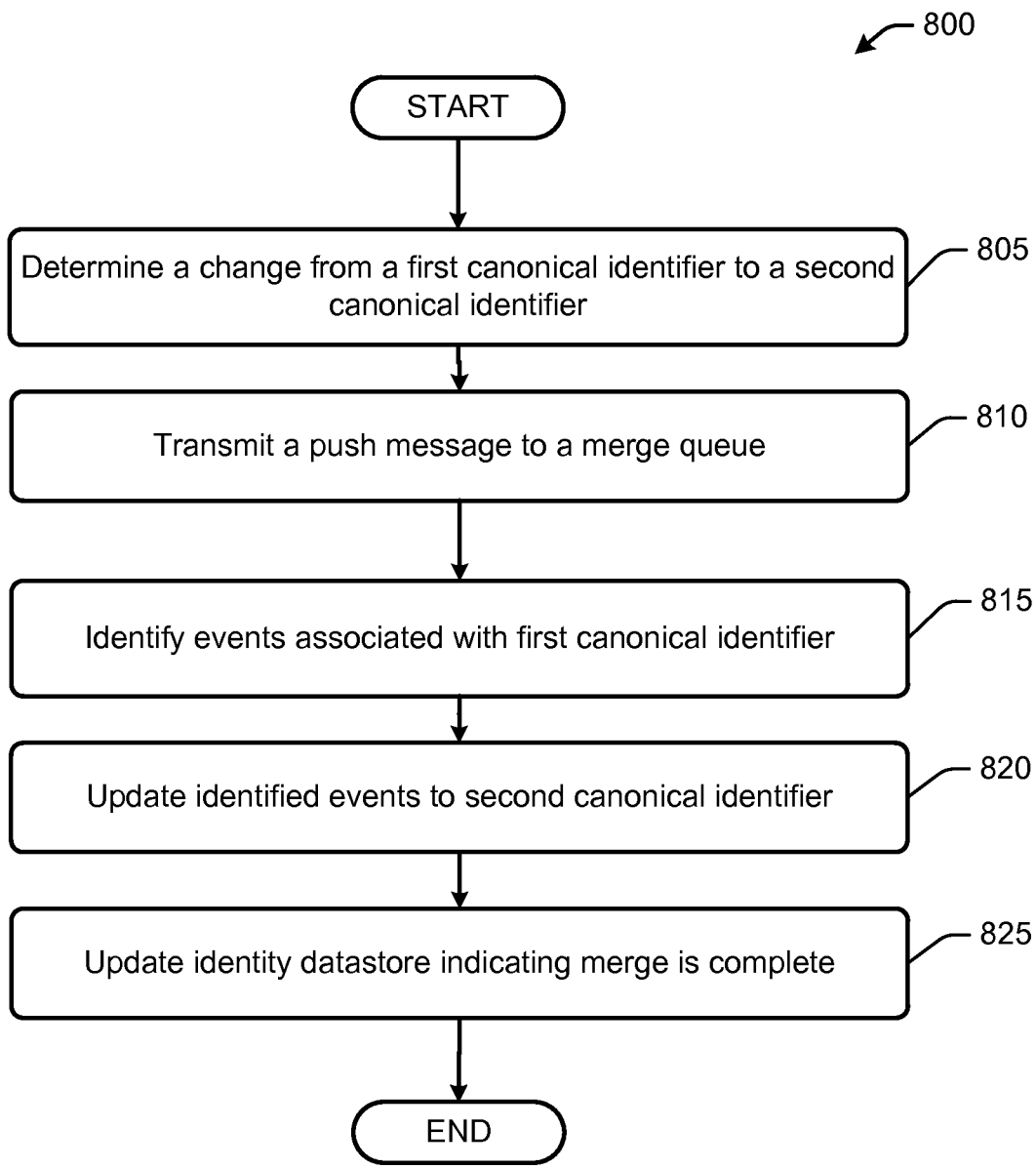
FIG. 8 is an illustrative process flow diagram for a method for merging identifiers in an identity resolution service in accordance with one or more embodiments of the disclosure.

FIG. 8 is an illustrative process flow diagram for a method 800 for merging identifiers in an identity resolution service in accordance with one or more embodiments of the disclosure. At block 805, in some embodiments, the identity merge engine 248 of the IRS server 112 may determine a change from a first canonical identifier to a second canonical identifier. For example, identity merge engine 248 may identify metadata associated with the first canonical identifier and/or the second canonical identifier indicating that a merge needs to be initiated. In some embodiments, one or more fields associated with the first canonical identifier and/or the second canonical identifier may indicate that a merge needs to be initiated.

At block 810, the identity merge engine 248 may generate a push message and transmit the push message to a merge queue. In some embodiments, the push message may include the first canonical identifier (e.g., the old canonical identifier), the second canonical identifier (e.g., the new canonical identifier), and a time range.

At block 815, events (e.g., advertising events) associated with the first canonical identifier may be identified. In some embodiments, the events that fall within the time range may be identified.

At block 820, the events identified in block 815 may be updated to the second canonical identifier. In some embodiments, the events may still be associated with the first canonical identifier for a pre-determine period of time to ensure that events are properly identified. In some embodiments, the events may be immediately associated with the second canonical identifier and disassociated with the first canonical identifier.

At block 825, the identity mapping engine may update the identity datastore to indicate that the merge or transition from the old canonical identifier to the new canonical identifier is complete. In some embodiments, if there are events still associated with the first canonical identifier, the identity mapping engine 246 may remove the association and indicate in the identity datastore 520 (e.g., via metadata) that the merge has been completed.

In some embodiments, the system architecture may include a CES service server 510. The data management engine 515 of the CES service server 510 may determine a change from a first canonical identifier to a second canonical identifier and may generate and transmit the push message to initiate the merge of events.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which, when executed by a processor, cause the processor to perform operations comprising:

receiving identity mappings from a first server of one or more servers;

generating a plurality of canonical identifiers and canonical identifier mappings based on the identity mappings from the first server;

receiving a first request from a second server of the one or more servers, wherein the first request comprises a first identifier and a first timestamp, wherein the first identifier is associated with a first application of a first device;

receiving a second request from the second server, wherein the second request comprises a second identifier and a second timestamp, wherein the second identifier is associated with a second application of a second device;

determining an identifier hierarchy comprising a plurality of ranked tiers including a first tier and a second tier, wherein the first tier is ranked higher than the second tier;

determining, based at least in part on the identifier hierarchy, that the first identifier and the second identifier are associated with the same tier;

generating a constructed canonical identifier, wherein the constructed canonical identifier indicates the first identifier associated with the first device and the second identifier associated with the second device, and wherein the constructed canonical identifier is a first canonical identifier, and wherein user information is not associated with at least one of the first identifier or the second identifier;

receiving a third request from the second server, wherein the third request comprises a third identifier and a third timestamp, wherein the third identifier is associated with a first user, and the third identifier is associated with a third application of a third device;

receiving a fourth request from the second server, wherein the fourth request comprises a fourth identifier and a fourth timestamp, wherein the fourth identifier is associated with a second user;

determining that the first timestamp is prior to a login associated with the third timestamp, the second timestamp is subsequent to a logout at the time of the third timestamp, and the second timestamp is prior to a login associated with the fourth timestamp;

generating a second canonical identifier using the first identifier, the second identifier, and the third identifier;

updating a first canonical identifier mapping of the canonical identifier mappings to include the second canonical identifier, the updating based at least in part on determining that the third identifier is ranked higher than the constructed canonical identifier using the identifier hierarchy;

causing the constructed canonical identifier to be deleted;

generating a response to the third request comprising the second canonical identifier; and transmitting the response to the second server.

2. The non-transitory computer-readable medium of claim 1, wherein the first identifier or the second identifier is one of an ad user identifier, an ad browser identifier, a stable identity service (SIS) device identifier, or a device identifier.

3. The non-transitory computer-readable medium of claim 1, wherein the operations further comprise:

initiating a merge to update events associated with the first canonical identifier to the second canonical identifier.

4. The non-transitory computer-readable medium of claim 3, wherein initiating the merge to update the events further comprises:

generating a message with the first canonical identifier, the second canonical identifier, and a time range, wherein a third server of the one or more servers will identify events associated with the first canonical identifier within the time range and associate the events with the second canonical identifier.

5. A computer-implemented method comprising:

receiving, by an identity resolution system comprising one or more processors, a first request from a server, wherein the first request comprises a first identifier and a first timestamp, wherein the first identifier is associated with a first application of a first device;

receiving, by the identity resolution system, a second request from the server, wherein the second request comprises a second identifier and a second timestamp, wherein the second identifier is associated with a second application of a second device;

determining, by the identity resolution system, an identifier hierarchy comprising a plurality of ranked tiers including a first tier and a second tier, wherein the first tier is ranked higher than the second tier;

determining, by the identity resolution system, based at least in part on the identifier hierarchy, that the first identifier and the second identifier are associated with the same tier;

generating, by the identity resolution system, a constructed canonical identifier, wherein the constructed canonical identifier indicates the first identifier associated with the first device and the second identifier associated with the second device, and wherein the constructed canonical identifier is a first canonical identifier, and wherein user information is not associated with at least one of the first identifier or the second identifier;

receiving, by the identity resolution system, a third request from the server, wherein the third request comprises a third identifier and a third timestamp, wherein the third identifier is associated with a first user account, and the third identifier is associated with a third application of a third device;

receiving, by the identity resolution system, a fourth request from the server, wherein the fourth request comprises a fourth identifier and a fourth timestamp, wherein the fourth identifier is associated with a second user account;

determining, by the identity resolution system, that the first timestamp is prior to a login associated with the third timestamp, the second timestamp is subsequent to a logout at the time of the third timestamp, and the second timestamp is prior to a login associated with the fourth timestamp;

generating, by the identity resolution system, a second canonical identifier based at least in part on the first identifier, the second identifier, and the third identifier;

updating, by the identity resolution system, a canonical identifier mapping to include the second canonical identifier, the updating based at least in part on determining that the third identifier is ranked higher than the constructed canonical identifier using the identifier hierarchy;

causing, by the identity resolution system, the constructed canonical identifier to be deleted;

generating, by the identity resolution system, a response to the third request comprising the second canonical identifier; and transmitting, by the identity resolution system, the response to the server.

6. The computer-implemented method of claim 5, further comprising:

receiving, by the identity resolution system, identity mappings from the server; and generating, by the identity resolution system, a plurality of canonical identifiers and canonical identifier mappings based on the identity mappings from the server.

7. The computer-implemented method of claim 5, wherein determining that the third identifier is ranked higher comprises:

comparing, by the identity resolution system, a type associated with the third identifier and a type associated with the constructed canonical identifier using the identifier hierarchy comprising a plurality of types of identifiers.

8. The computer-implemented method of claim 5, wherein first the identifier, or the second identifier is one of an ad user identifier, an ad browser identifier, a stable identity service (SIS) device identifier, or a device identifier.

9. The computer-implemented method of claim 5, further comprising:

receiving, by the identity resolution system, an identity mapping from a second server, wherein the identity mapping comprises a fifth identifier;

determining, by the identity resolution system, the second canonical identifier is associated with the identity mapping using the fifth identifier;

determining, by the identity resolution system, a type associated with the fifth identifier;

comparing, by the identity resolution system, the type associated with the second canonical identifier with the type associated with the fifth identifier using the identifier hierarchy;

determining, by the identity resolution system, that the type associated with the fifth identifier is ranked higher than the type associated with the second canonical identifier using the identifier hierarchy;

generating, by the identity resolution system, a third canonical identifier using the fifth identifier; and updating, by the identity resolution system, the canonical identifier mapping.

10. The computer-implemented method of claim 9, further comprising:

initiating, by the identity resolution system, a merge to update events associated with the canonical identifier by transmitting a message to a merge server.

11. The computer-implemented method of claim 9, wherein the identity mapping was retrieved from a stable identity service (SIS) data feed, a data service data feed, or a special offers service data feed.

12. The computer-implemented method of claim 5, wherein determining that the third identifier is ranked higher comprises:

determining, by the identity resolution system, a type associated with the third identifier by detecting a prefix value of the third identifier indicating the type associated with the third identifier.

13. A system comprising:
at least one memory that stores computer-executable instructions; and
at least one processor configured to access the at least one memory and execute the computer-executable instructions to:
receive a first request from a server, wherein the first request comprises a first identifier and a first timestamp, wherein the first identifier is associated with a first application of a first device;
receive a second request from the server, wherein the second request comprises a second identifier and a second timestamp, wherein the second identifier is associated with a second application of a second device;
determine an identifier hierarchy comprising a plurality of ranked tiers including a first tier and a second tier, wherein the first tier is ranked higher than the second tier;
determine, based at least in part on the identifier hierarchy, that the first identifier and the second identifier are associated with the same tier;
generate a constructed canonical identifier, wherein the constructed canonical identifier indicates the first identifier associated with the first device and the second identifier associated with the second device, and wherein the constructed canonical identifier is a first canonical identifier, and wherein user information is not associated with at least one of the first identifier or the second identifier;
receive a third request from the server, wherein the third request comprises a third identifier and a third timestamp, wherein the third identifier is associated with a first user account, and the third identifier is associated with a third application of a third device;
receive a fourth request from the server, wherein the fourth request comprises a fourth identifier and a fourth timestamp, wherein the fourth identifier is associated with a second user account;
determine that the first timestamp is prior to a login associated with the third timestamp, the second timestamp is subsequent to a logout at the time of the third timestamp, and the second timestamp is prior to a login associated with the fourth timestamp;
generate a second canonical identifier based at least in part on the first identifier, the second identifier, and the third identifier;
update a canonical identifier mapping to include the second canonical identifier, the update based at least in part on determining that the third identifier is ranked higher than the constructed canonical identifier based at least in part on the identifier hierarchy;
cause the constructed canonical identifier to be deleted;
generate a response to the third request comprising the second canonical identifier; and
transmit the response to the server.

14. The system of claim 13, wherein the at least one processor is configured to access the at least one memory and to further execute the computer-executable instructions to:
receive identity mappings from the server; and
generate a plurality of canonical identifiers and canonical identifier mappings based on the identity mappings from the server.

15. The system of claim 13, wherein to determine that the third identifier is ranked higher, the at least one processor is configured to access the at least one memory and to further execute the computer-executable instructions to:
compare a type associated with the third identifier and a type associated with the constructed canonical identifier using the identifier hierarchy comprising a plurality of types of identifiers.

16. The system of claim 13, wherein the first identifier or the second identifier is one of an ad user identifier, an ad browser identifier, a stable identity service (SIS) device identifier, or a device identifier.

17. The system of claim 13, wherein the at least one processor is configured to access the at least one memory and to further execute the computer-executable instructions to:
receive an identity mapping from a second server, wherein the identity mapping comprises a fifth identifier;
determine the second canonical identifier is associated with the identity mapping using the fifth identifier;
determine a type associated with the fifth identifier;
compare the type associated with the second canonical identifier with the type associated with the fifth identifier using the identifier hierarchy;
determine that the type associated with the fifth identifier is ranked higher than the type associated with the second canonical identifier using the identifier hierarchy;
generate a third canonical identifier using the fifth identifier; and
update the canonical identifier mapping.

18. The system of claim 17, wherein the at least one processor is configured to access the at least one memory and to further execute the computer-executable instructions to:
initiate a merge to update events associated with the canonical identifier by transmitting a message to a merge server.

19. The system of claim 17, wherein the identity mapping was retrieved from a stable identity service (SIS) data feed, a data service data feed, or a special offers service data feed.

20. The system of claim 13, wherein to determine that the third identifier is ranked higher, the at least one processor is configured to access the at least one memory and to further execute the computer-executable instructions to:
determine a type associated with the third identifier by detecting a prefix value of the third identifier indicating the type associated with the third identifier.

* * * * *